(12) United States Patent
Gonçalo Nuno Chendo et al.

(10) Patent No.: US 11,831,703 B2
(45) Date of Patent: Nov. 28, 2023

(54) SYSTEM AND METHOD FOR SUPPORTING PERMANENT HTTP CONNECTIONS

(71) Applicant: ALTICE LABS, S.A., Aveiro (PT)

(72) Inventors: Gaspar Gonçalo Nuno Chendo, Aveiro (PT); Rodrigues Carlos Manuel Da Silva, Aveiro (PT); Santana Helder Lino, Aveiro (PT)

(73) Assignee: ALTICE LABS, S.A., Aveiro (PT)

( * ) Notice: Subject to any disclaimer, the term of this patent is extended or adjusted under 35 U.S.C. 154(b) by 0 days.

(21) Appl. No.: 17/789,063

(22) PCT Filed: Dec. 22, 2020

(86) PCT No.: PCT/IB2020/062327
§ 371 (c)(1),
(2) Date: Jun. 24, 2022

(87) PCT Pub. No.: WO2021/137098
PCT Pub. Date: Jul. 8, 2021

(65) Prior Publication Data
US 2023/0086156 A1  Mar. 23, 2023

(30) Foreign Application Priority Data
Dec. 30, 2019 (PT) ......................... 116035

(51) Int. Cl.
*H04L 67/02* (2022.01)
*H04L 67/141* (2022.01)
*H04L 67/145* (2022.01)

(52) U.S. Cl.
CPC ............ *H04L 67/02* (2013.01); *H04L 67/141* (2013.01); *H04L 67/145* (2013.01)

(58) Field of Classification Search
None
See application file for complete search history.

(56) References Cited

U.S. PATENT DOCUMENTS

2016/0094686 A1* 3/2016 Yasuma ................ H04W 76/10
                                                          709/230
2019/0245767 A1* 8/2019 Di Girolamo ........ H04L 69/164

* cited by examiner

*Primary Examiner* — Quang N Nguyen
(74) *Attorney, Agent, or Firm* — ArentFox Schiff LLP

(57) ABSTRACT

A system and method are provided to support a scenario where a cluster of HTTP—Hypertext Transfer Protocol— servers has to accept and maintain permanently open HTTP connections with a large number of client devices. The proposed system relies on HTTP/2 and Server-sent Events— SSE—in order to keep connections open and to allow bidirectional message exchange between client and server. It is comprised by following computational entities: at least one connection redirector entity, at least two connection handler entities, a location registry entity and an execution server entity configured to support an API implementation adapted to provide an interface for external systems. The connection between the system and the client device is performed through an internet connection.

14 Claims, 5 Drawing Sheets

SYSTEM AND METHOD FOR SUPPORTING PERMANENT HTTP CONNECTIONS

CROSS-REFERENCE TO RELATED APPLICATIONS

This application is a National Stage entry of International Application No.: PCT/IB2020/062327, filed Dec. 22, 2020, which claims priority to Portuguese Patent Application No. 116035, filed Dec. 30, 2019. The disclosures of the priority applications are hereby incorporated in their entirety by reference.

FIELD OF THE INVENTION

The present invention is enclosed in the field of communication systems. Particularly, it relates to systems and methods for providing support to a large number of Hypertext Transfer Protocol (HTTP) connections between a cluster of HTTP servers and HTTP clients.

PRIOR ART

Usually web-based applications have to deal with a large number of clients connected and consuming its services. The most popular services on the Internet have to deal with that and there are several ways to scale HTTP server clusters to support up to several millions of clients. On those common scenarios, clients connect to the server, consume the services they intend to, and then tear down the connection. The next time they need to consume a service, a new connection is established specifically for that interaction.

Scenarios where HTTP connections can remain established for more than one transaction were first covered by web sockets technology, but that came with its own challenges since it overrides some HTTP protocol functions and it is not simple to use. Also, it is more suitable for short duration connections, even if with various interactions between servers and clients. HTTP/2 and SSE (Server-sent Events) on the other hand provide the suitable environment to full duplex communications between servers and clients, and the stream architecture of HTTP/2 also eases the way multiple communication flows can be managed.

Other very common approach on IoT (Internet of Things) scenarios are messaging technologies, like MQTT (Message Queuing Telemetry Transport) and AMQP (Advanced Message Queuing Protocol). These technologies also rely on permanently open connections. Nevertheless, they are quite simple protocols designed to carry very small messages, they don't provide the capabilities HTTP provides and can be very limited on some IoT or device management scenarios. Another problem is scalability. To support a very large number of connections, the cluster would become too large, and the requirements for synchronization between instances would make it very difficult to have cluster expanding along different geographical locations. Also, the fact that usually they are not supported on HTTP can be a problem for clients inside firewall protected environments.

Problem to be Solved

The present invention applies to scenarios where clients stay connected to the HTTP server indefinitely.

The proposed approach is very useful when the HTTP connection is supporting a communication channel between the server and the client that can be used for communication sessions that can be triggered either by the client or the server, as opposite to the classical scenario where it is always the client to take the initiative. This can be used on different types of scenarios and applications, being of particular interest to manage CPEs (Customer Premises Equipment) and on IoT scenarios, where the clients may be on private or firewall protected networks, and servers are supporting management platforms that would not have the possibility to issue commands without a pre-established communication channel. On this scenario the clients are consuming server resources permanently, since the server must keep connections open to all its clients, and not only when there is communication between client and server.

SUMMARY OF THE INVENTION

On a regular HTTP communication between a client and a server, communication is started by the client, messages are exchanged in the form of requests from the client and responses from the server, and after that brief exchange of information the connection is tear down.

On the scenario this invention is applied, the client takes the initiative of establishing a connection, usually immediately after it boots, and that connection is maintained open for as long as the client is up (that can be for several days or months). Combined with HTTP/2 and SSE capabilities, this allows the server to be able to take the initiative of sending messages to the client, without having to establish connectivity and without having to wait for a request from it. This invention also takes advantaged of HTTP/2 multiplexed streams so that multiple requests (for example notifications) can be sent to the server in parallel. If somehow the connection is broken the client tries to reestablish the connection to the server until it succeeds. If on one hand this approach provides flexibility for the server to contact every client whenever needed without waiting for a contact from it, on the other hand it places on the server system a considerable load where it has to deal with a very large number of connections that are kept permanently established.

This invention defines a system and methods to handle a very large number of HTTP connections permanently established in a way that it can scale to several millions of clients connected with an efficient use of computational resources. Since this invention intends to be a module to support connectivity for a higher-level business application, it also has to provide a method to locate the server from the cluster that is currently supporting the connection to a given client. That method has to be efficient for several millions of clients and has to keep up to date information about the connections. This is very useful for scenarios where usually communication is most needed when for some reason a device boots or has to reestablish connection.

DETAILED DESCRIPTION

Figure 1:
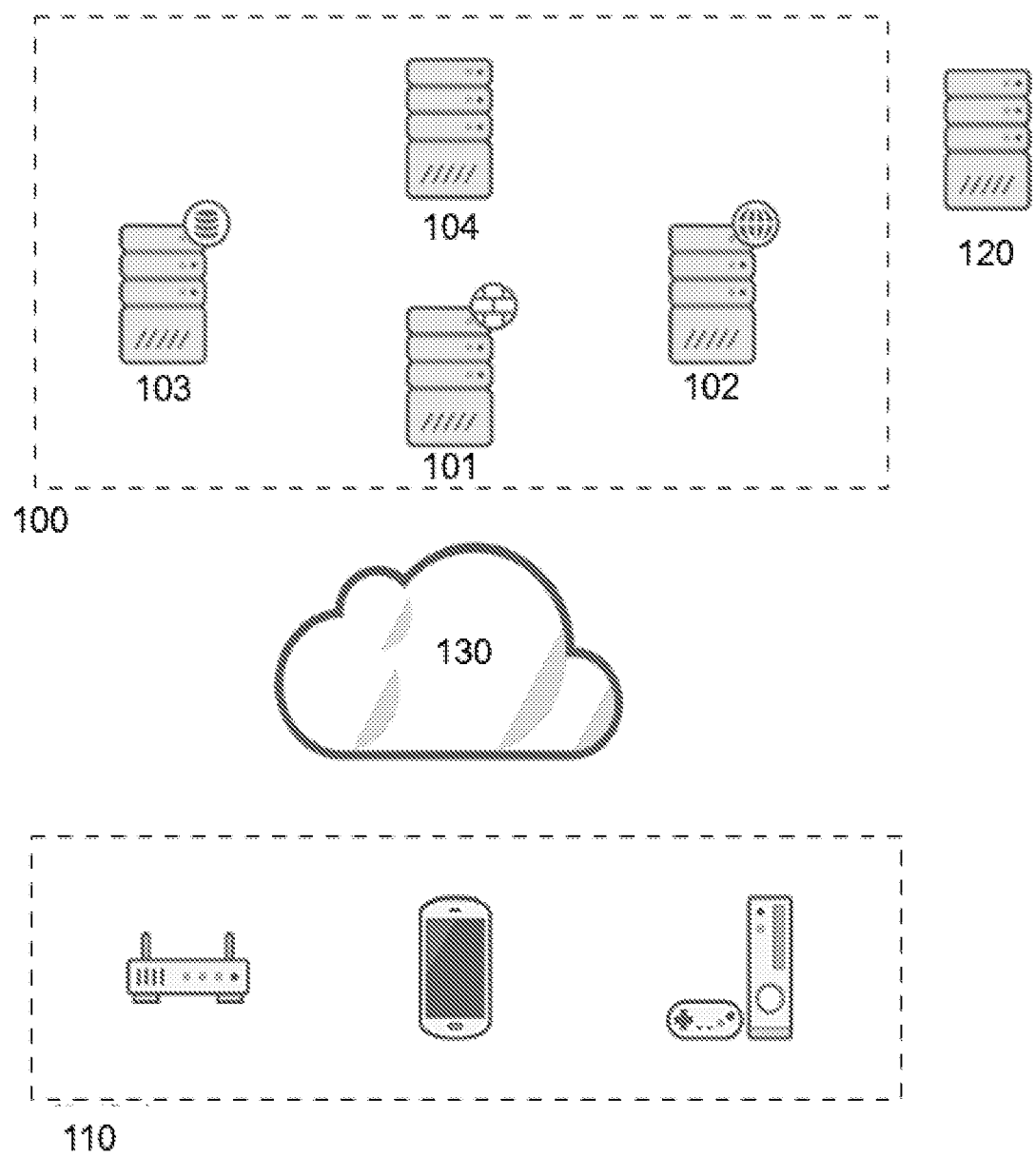
FIG. 1 shows a diagram representing the communication environment in which some embodiments of the invention may be implemented.

FIG. 1 shows a typical environment where the invention can be applied. A set of client devices (110) that can range from telecom CPEs to IoT devices or even smartphones are connected through an IP network to one or several datacenters where the system (100) is instantiated. More generally they can be connected to the internet and have IP connectivity to the system's servers.

This invention does not require any particular feature from the devices, other than the support for HTTP/2 and SSE. The type of devices and their operating system or computational capabilities are not relevant on the context of this invention. The particular embodiment used as a reference to describe this invention is a telco application to manage CPEs but this should not be interpreted as the only possible embodiment. The method to establish and sustain the HTTP connections is generic enough to be used by any business application that may require this framework as a basis to establish communication channels between any types of entities.

The system (100) is composed by a set of hosts. Those hosts may be materialized using virtual servers, physical servers, containers, or any other type of computational entities. They can also be located on a single datacenter or spread across several datacenters, being the traffic routed on the network to the best location possible given the connecting device conditions (geographical or other).

Connection Redirectors (101) are the servers that are first receiving client connection requests. Their function is to receive a connection request, select the best Connection Handler (102) to handle that connection, and then redirect the HTTP connection request to that server. The criteria by which the Connection Redirector (101) selects the appropriate Connection Handler (102) is configurable, and decision factors may be added, but they must at least consider the number of connections that each Connection Handler is already sustaining, and the location of the client.

Connection Handlers (102) are the servers that are maintaining the HTTP/2 sessions to the devices permanently open. Those connections must use SSE so it is possible to send messages from the servers to the devices that are connected. The use of HTTP/2 and SSE, together with the internal structure Connection Handler allows a single Connection Handler to sustain a large number of open connections, that are permanently established. Nevertheless, on large deployments one may need more established connections than a single Connection Handler can handle and the system is designed taking that into consideration, in a way that Connection Handlers don't even have to be all on the same datacenter, and they can be elastically changed, instantiated and tear down, according to service demands, on an elastic environment, typical of cloud computing.

Location Registry (103) are keeping track of what connections are established to what Connection Handlers (102). This is fundamental, because when one wants to send a message to a device that is connected, the first step of the process is to look for the Connection Handler that is holding the connection to that device.

Execution Servers (104) are supporting an API implementation that provides the interface for External Systems (120) to use the communication resources provided by this system in benefit of their own business logic. They are prepared to receive requests from External Systems that want to send messages to devices, be able to direct that request to the communication session already open on a particular Connection Handler (102), and wait for the device response sent through the same connection and answer back to the requester.

Figure 2:
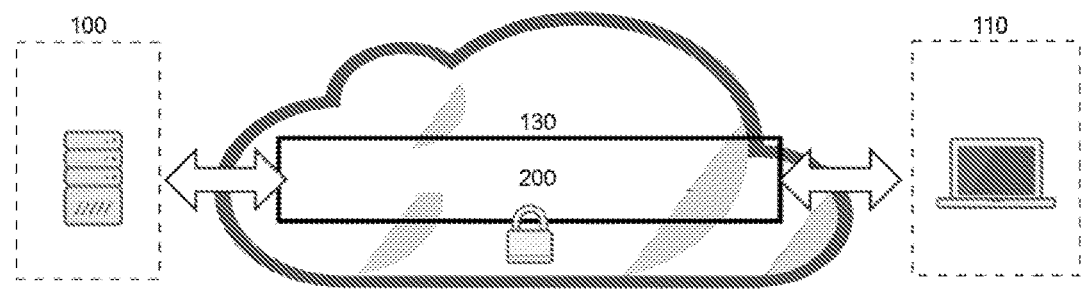
FIG. 2 shows how HTTP/2 and SSE are used to support bidirectional exchange of messages using only one HTTP/TCP connection.

FIG. 2 shows how HTTP/2 and SSE are used to support bidirectional exchange of messages using only one HTTP connection. HTTP/2 200 with the multiplexed streams feature is used in order to reduce the number of TCP (Transmission Control Protocol) connections needed and the overhead of having to setup and tear down the connections multiple times for each communication initiative from the client.

The connection is established with an HTTP/2 GET using stream 1 in order for the client to perform the subscription and the response is issued with the "content-type: text/event-stream; charset=utf-8" header in order to establish the SSE. From there, stream 1 is used to issue all the keepalives and commands from the server to the client. The client responds to the commands, sends commands or sends notifications using other stream ids.

Figure 3:
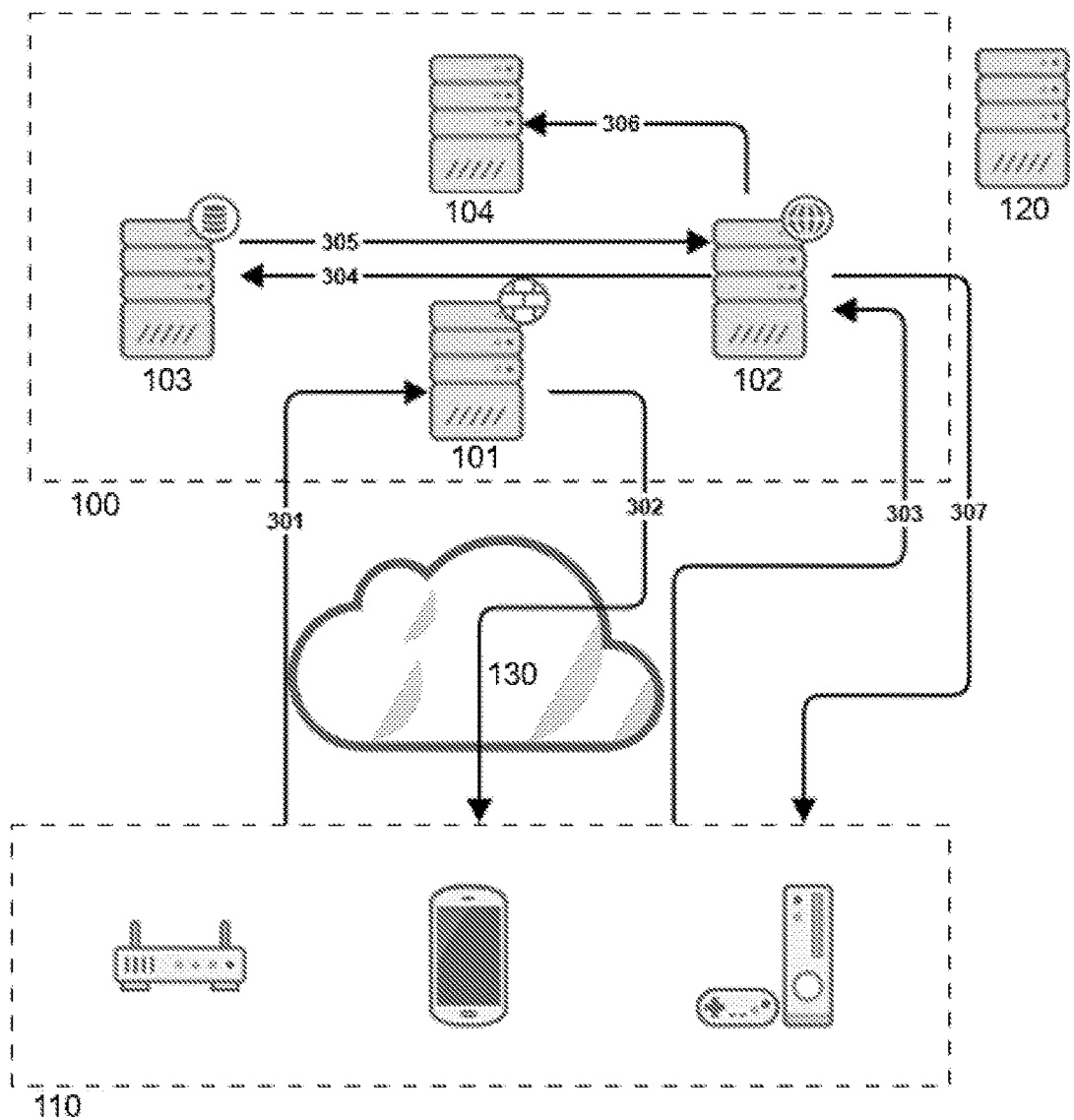
FIG. 3 is a sequence diagram that depicts the process of a client application connecting to an embodiment of this invention and all the steps necessary to establish that connection, and after that the way it can be used to sustain the sending of messages from server to client.

FIG. 3 shows the sequence of events that take place when a new session is initiated and all the components interact to create the conditions necessary for it to be managed and maintained.

On instant 301, a new device comes up and tries to open a permanent HTTP/2 connection with the system. The device reaches one of the multiple Connection Redirectors 101 available. The way the device obtains the endpoint to connect to a particular Connection Redirector is not relevant. The usual is through name resolution through a DNS (Domain Name System) server that can distribute the load between several instances of Connection Redirectors.

At 302, the Connection Redirector 101 chooses a Connection Handler 102 where the device should connect. When choosing the Connection Handler 102, the Connection Redirector 101 must take into consideration the localization, availability and the load of each one of the Connection Handlers 102. There should be a fair load distribution between the servers available, and there should be only chosen Connection Handlers 102 that are up and running. Once the Connection Handler 102 is chosen, the Connection Redirector 101 replies to the client with an HTTP/2 response code 302 and the URL (Uniform Resource Locator) where the client 110 should connect.

On 303, the device tries again to connect, but this time to the Connection Handler 102 that was assigned by the Connection Redirector 101. The chosen Connection Handler 102 receives the connection request and it accepts it, completing the TCP three way handshaking and establishing the TCP connection.

On step 304, the location registry entity 103 registers the new connection. The Location Registry 103 receives a message indicating the device 110 identification, and the identification of the Connection Handler 102, and then it stores that information for future use. After these steps, on 305, the Location Registry 103 signals to the Connection Handler 102 that the registry is ok, and that the establishment of the HTTP/2 session was accepted. One additional step is performed at 306, where the Connection Handler 102 notifies the execution server 104 that a new connection is available. This will allow the Execution Server 104 to get to know about the possibility to communicate with that device 110. The Execution Server 104 may use this to dispatch any request pending on its work queue.

Finally, on 307, the Connection Handler 102 sends the HTTP 200 OK response to the device 110 and the connection is established, and it will be kept established with a periodical keepalive message with the current timestamp being sent periodically. If there is any error on the process, the Connection Handler 102 will respond with a different HTTP code, describing the error occurred, usually a 400 or 500 code, and the session will be terminated.

Figure 4:
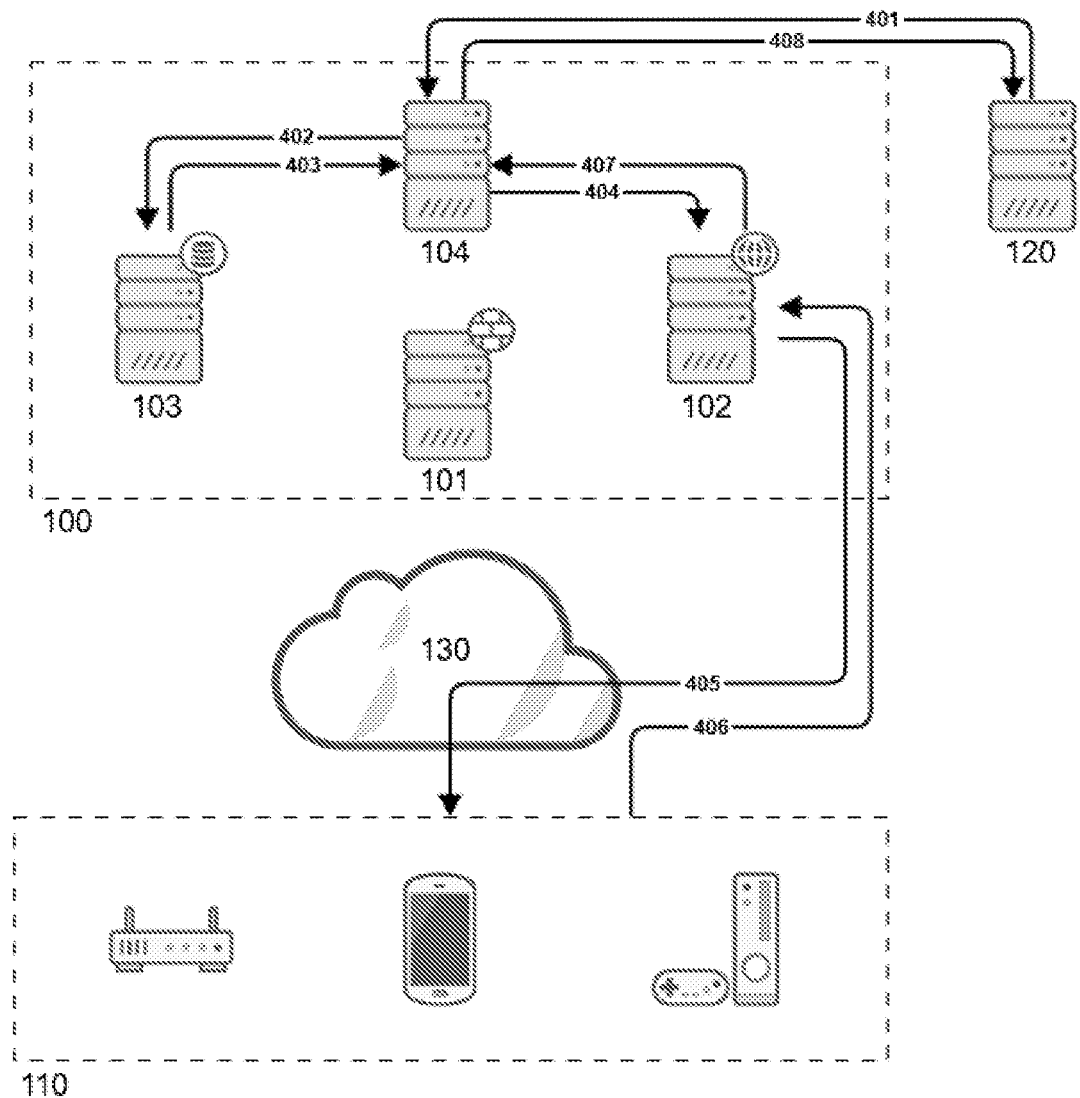
FIG. 4 is a sequence diagram that represents the process of an External System using this invention to send a message to a device that is connected.

FIG. 4 shows how an External System 120 can contact a client device 110, immediately and by its own initiative, using this architecture. To reach this objective it is necessary to use the permanent HTTP/2 connection opened by the client device 110, so it is necessary first to find the Connection Handler entity 102 that is holding that connection and to forward the request to it.

On step 401, an External System 120 interested on exchanging information with one of the managed devices (110), issues a request to the system through its API (Application Programming Interface) implementation on the Execution Server entity 104. The message must contain the information to be sent to the device 110 and the identification of the specific device 110.

On 402, The Execution Server 104 queries the Location Registry 103 to find the Connection Handler 102 that is currently maintaining a connection for the targeted device 110.

On step 403 the Location Registry 103 replies to the Execution Server 104 with the identification of the Connection Handler 102 that has an open connection to the targeted device 110. If there is no open connection to that device 110, the Execution Server 104 may reply to the External System 120 with an error, or it may store that operation on a work queue, to be executed as soon as there is a new connection to that device 110. That is why on FIG. 3, step 306, the Connection Handler 102 is notifying the Execution Server 104 that a new connection is available. It's up to the External System 120 to pass information on the request stating if it wants the operation to wait on queue and for how long.

On 404, the Execution Server 104 sends the request to the Connection Handler 102 that is holding the connection to the targeted device 110.

On 405, the Connection Handler 102 sends the message to the device 110 using the SSE channel that was established on stream 1 of the HTTP/2 connection.

Step 406 is when the device 110 replies to the message using another stream of the same HTTP/2 connection.

On 407, after receiving the response from the device, the Connection Handler 102 delivers the device response to the Execution Server 104.

Finally, on 408, the External System 120 receives the response for the message sent to the device 110.

Figure 5:
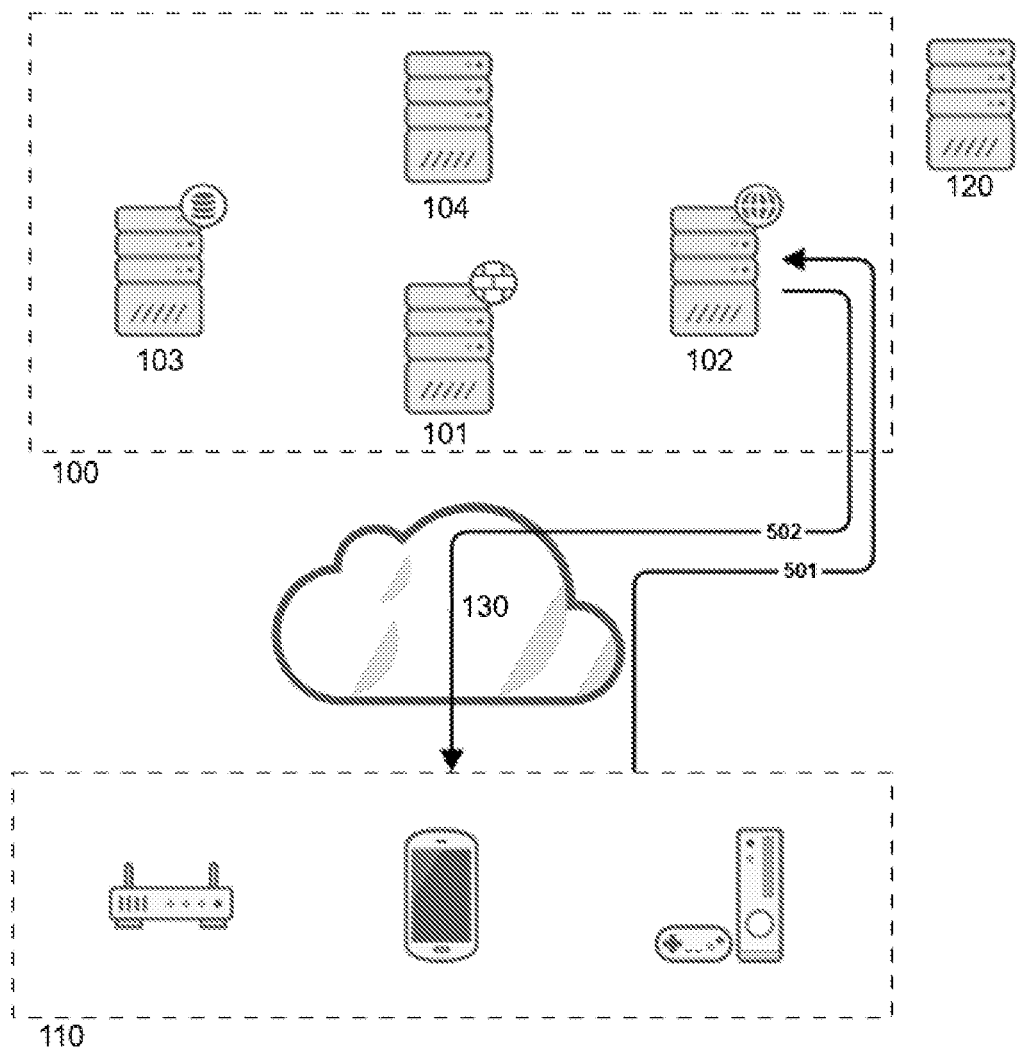
FIG. 5 is a sequence diagram showing the keepalive mechanism that is used by each Connection Handler server to assess the validity of each open connection.

FIG. 5 describes the message exchange that is used to implement the keepalive mechanism that is used by the System to probe each one of the open connections. The mechanism consists on the System sending periodically a special type of request. If the client device 110 responds the connection is still active. If the client device 110 does not respond or an error is received, the connection is no longer valid and it is closed by the System. It is up to the client to reestablish the connection once again, as soon as possible.

Once again, using HTTP/2 and SSE allows to implement the mechanism in a way that the Connection Handler 102 triggers the request to the client device 110. This allows the system to be proactive on validating the connections, and so it knows faster if a connection was abnormally terminated. It is up to the Connection Handler 102 server to implement this mechanism and it is done in a way where it doesn't involve any other module in the system, so this process can scale easily.

The client device 110 can also be configured to send performance parameters. E.g. it can send counter values and administrative status for its services and modules. The device 110 can do this periodically or whenever relevant events happen. This feature might be useful to external applications using this invention to support their business logic. This is a way to take advantage and add value to this periodic exchange of information and of the system that is holding all the HTTP connections open.

Figure 6:
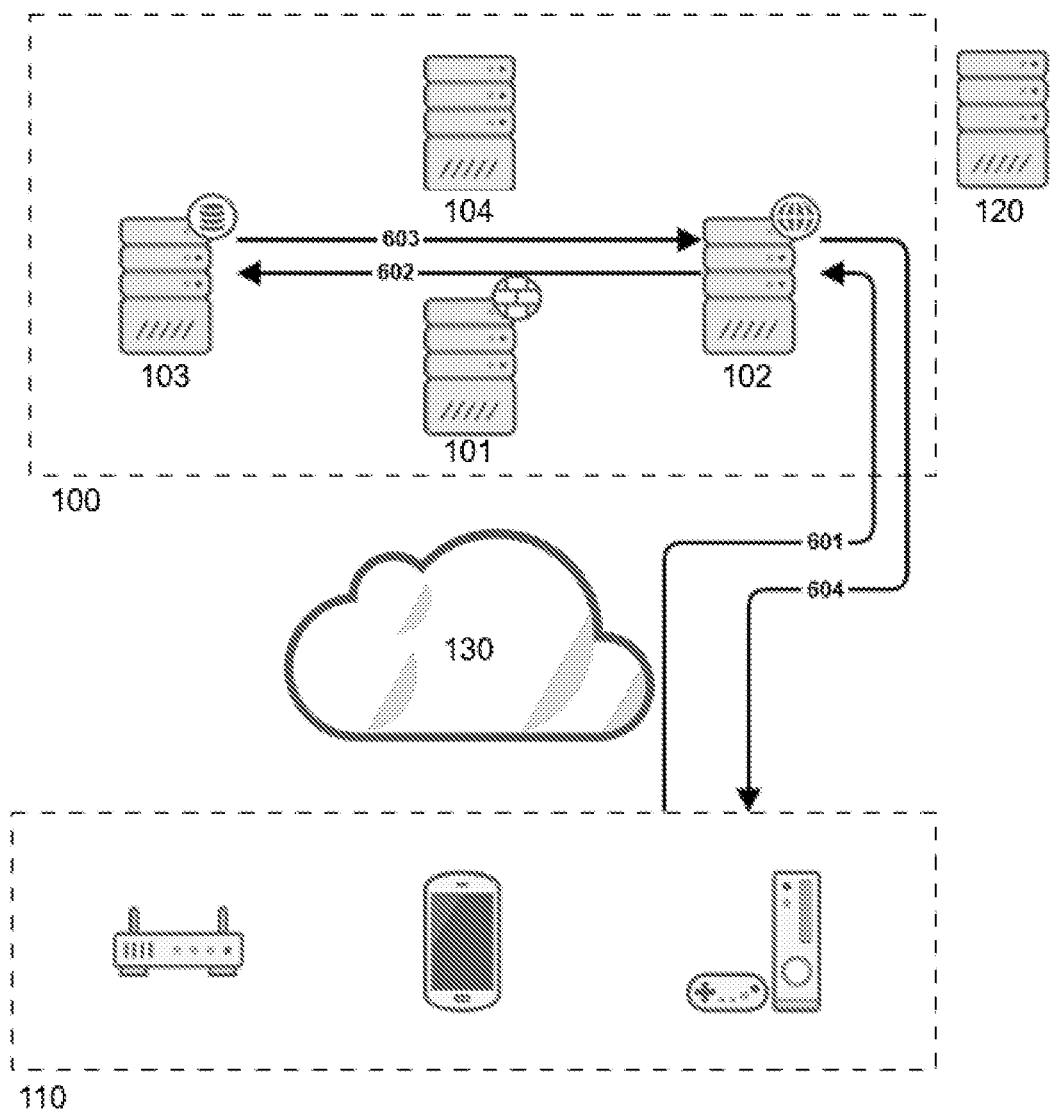
FIG. 6 is a sequence diagram that illustrates the process of tearing down a permanent connection.

FIG. 6 shows how the client can tear down a connection. This represents a situation when the connection is graciously terminated, and always happens by the client initiative. A common situation when this scenario occurs is when the client device powers down or boots.

On step 601, the device informs the system about its intention to tear down the connection, using a new stream on the permanently open HTTP/2 connection.

On 602, the Connection Handler sends the unsubscribe notification to the Location Registry.

On 603, the Location Registry changes the device connection status to unavailable and responds with a 200 OK.

On 604, the Connection Handler responds with an HTTP 200 OK to unsubscribe and the device starts to tear down the TCP connection.

Description of the Embodiments

The following description is presented to enable any person skilled in the art to build and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

It is presented a system and method for supporting a large number of permanent HTTP connections wherein HTTP connections are permanently established, supported on a cluster of servers that are maintaining those connections, where:
  the servers being collocated or geographically distributed, implemented in a way where servers are independent from each other and need to exchange the minimum amount of information with other elements of the system, so they can scale horizontally and be deployed on elastic cloud environments, where server instances can be instantiated or deleted according to the load to be supported by the system;
  the method of receiving a connection request sent by a device to the system, wherein the client sends the connection request to an IP address of a particular Connection Redirector; there may be several of those servers in this system, and the address of a particular server was obtained querying a DNS server, that distributes requests along all available servers;
  selecting at the Redirect Server one of the Connection Handlers available, using a load balancing criteria, to share the load across all available Connection Handlers, also avoiding any unavailable server that may be down;

the criteria used to choose the right Connection Handler has to consider at least the load on all servers available and the geographic location of the client; the Connection Redirector sends the HTTP redirection request back to the device, instructing it to connect to the appropriate Connection Handler;

receiving the connection request on the Connection Handler and establishing the HTTP connection with the device, and after that, updating a Location Registry, in order to maintain a registry of all open connections and the Connection Handler that is holding each one of them;

keeping the HTTP session always open, with a keepalive mechanism so server and client can confirm that the session is open.

In one embodiment the HTTP/2 and SSE are used so that the HTTP connection can be used to send messages on both directions: client to server and server to client; using:

the permanent connection mechanism and the multiplex streams architecture provided by HTTP/2;

using also the message format and the event stream content provided by SSE to implement this;

having this way a system that takes advantage of HTTP ubiquity on one hand, and on the other to provide a modular and decoupled approach to sustaining connections, that contrasts with typical message busses architectures where delicate and intensive synchronization interaction is needed between all elements of the cluster.

In another embodiment, the system supports an API that provides methods for other systems to send messages to the devices, and receive responses:

the API is supported on the Location Registry, that keeps track of what connections are open to each managed devices, and the Connection Handler that is supporting each one of them;

an External System uses the API, implemented on the Execution Server, to request the system to send a message to a particular device;

the API implementation looks up for the device HTTP connection on the Location Registry, and when it finds the connection to the device on the registry, the message is forwarded to the Connection Handler that is supporting the connection;

the Connection Handler uses the open HTTP/2 connection, and SSE capabilities to send the message to the device;

after receiving the message, the device can issue another message with a response that reaches the Connection Handler, using the same HTTP/2 open connection, and then is collected by the Execution Server and sent to the External System that made the call.

In another embodiment, a keepalive mechanism is implemented, that is supported by the server initiative, taking advantage of the stream event architecture of SSE over HTTP/2, so that the server can realize quickly and with low cost when a given client is not up anymore; this is very critical because some of the devices can be abruptly disconnected (e.g. CPEs or IoT devices that are unplugged), and holding dead connections for a long time can have a heavy cost on a large scale implementation; the Connection Handler uses an SSE event stream, supported on the same permanently open HTTP connection, to periodically send keepalive requests to the client that has a certain amount of time to respond, before the server considers the connection dead and closes it.

In another embodiment, the keepalive response from the device can be used to carry performance parameters about the device, like counters and status; this way the process of periodic interaction with each one of the devices can be also used to add business value.

Finally, in another embodiment, the system uses a secure transport layer: TLS (Transport Layer Security).

The invention claimed is:

1. A system for supporting permanent HTTP connections, comprising the following computational entities:

at least one connection redirector entity configured to redirect a client connection request to a connection handler entity;

at least two connection handler entities configured to maintain HTTP/2 connection to client devices permanently open, said connection using Server-Sent Events (SSE);

a location registry entity configured to register the connections between client devices and connection handler entities; and an execution server entity configured to support an API implementation adapted to provide an interface for external systems, and to establish a bidirectional communication channel between an external system and a client device through the SSE connection open between said client device and the respective connection handler entity;

wherein the HTTP/2 connection established between a connection handler entity and the client devices comprises multiplexed streams, wherein a stream id is used in a communication between the system and the client device and a different stream id is in the communication between the client device and the system.

2. The system according to claim 1, wherein the computational entities are virtual servers or physical servers.

3. The system according to claim 1, wherein the computational entities are located on a single datacenter or spread across several datacenters.

4. A method for operating the system comprising the following steps:

upon reception of a connection request issued by a client device a connection redirector entity selects a connection handler entity to handle the connection, and redirects the HTTP connection request to said entity;

once the connection handler entity is selected, the connection redirector entity replies to the client device with an HTTP/2 response code;

the selected connection handler entity receives a connection request from the client device, established using the response code sent by the connection redirector entity, and establishes a TCP connection;

the connection between the client device and the connection handler entity is registered by the location registry entity;

an execution server entity queries the registry entity and directs a request for contacting a client device, issued by an external system, to the connection handler entity, identified by the registry entity, that maintains connection to said client device using the SSE connection;

said connection handler entity sends the requests to the client device;

the response of the client device to the request of the external system, is redirected by execution server entity to the external system, through the connection handler entity, using the SSE connection established between the client device and the respective connection handler entity;

wherein the selection of a connection handler entity made by the connection redirector entity is executed based on a configurable criterion that considers at least the number of connections that each connection handler entity of the system is already sustaining and the location of the client making the connection request.

5. The method according to claim 4, wherein the location registry entity:
   stores the identification of the client device and the connection handler entity to which it is connected; and
   signals the respective connection handler entity that the establishment of the HTTP/2 session was accepted.

6. The method according to claim 4, wherein connection handler unit sends response to the client device informing that the connection is established, said response comprising information related to a timestamp for the periodically keepalive messages to be sent in order to keep the connection established.

7. The method according to claim 6, wherein the connection handler entity is configured to send periodically a keepalive message to the client device, and:
   if the client device responds then the connection between the connection handler and the client device is maintained;
   if the client device does not respond then the connection is no longer valid.

8. The method according to claim 6, wherein the response sent by the connection handler entity is a HTTP 200 OK code.

9. The method according to claim 4, wherein once a connection between a client device and a connection handler entity is performed, said connection handler entity notifies an execution server entity that a new communication is available.

10. The method according to claim 4, wherein the request issued by an external system to contact a client device includes information to be sent to the client device and identification of said client device.

11. The method according to claim 4, wherein if the execution server entity receives a request from an external system to contact a client device which does not have an established connection with a connection handler entity, or if said connection was not registered by the location registry entity, the execution server entity stores that request on a work queue to be executed as soon as the connection is established.

12. The method according to claim 4, wherein the request issued by the external system is directed by the connection handler to the client device using the SSE communication established a stream id of the HTTP/2 connection.

13. The method according to claim 11, wherein the client device responds to the request from the external system using a different stream id of the same HTTP/2 connection.

14. The method according to claim 4, wherein the communication between a client device and the respective connection handler is teared down according to the following steps:
   the client device informs the connection handler entity that it intends to tear down the connection between both, using a specific stream id of the HTTP/2 connection;
   the connection handler sends an unsubscribe notification to the location registry entity;
   the location registry entity changes the connection status to unavailable and informs the connection handler entity;
   the connection handler entity responds informs the client device which starts to tear down the TCP connection.

\* \* \* \* \*